H. F. PREFONTAINE.
SHUTTER OPERATING ATTACHMENT FOR CAMERAS.
APPLICATION FILED JUNE 13, 1918.
1,308,642. Patented July 1, 1919.
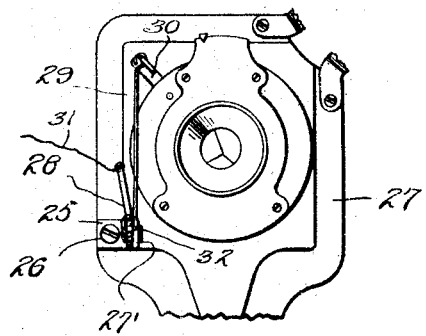
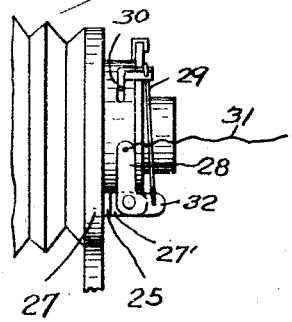
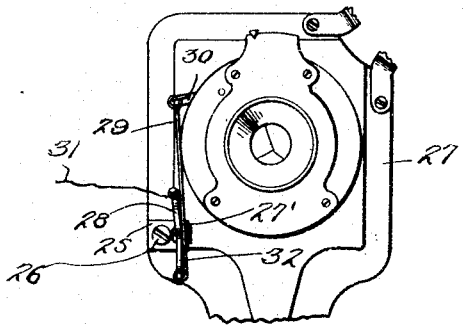
Inventor
Harry F. Prefontaine
By Percy H. Moore
Attorney.

UNITED STATES PATENT OFFICE.

HARRY F. PREFONTAINE, OF BROOKLYN, NEW YORK.

SHUTTER-OPERATING ATTACHMENT FOR CAMERAS.

1,308,642.  Specification of Letters Patent.  Patented July 1, 1919.

Application filed June 13, 1918. Serial No. 239,705.

*To all whom it may concern:*

Be it known that I, HARRY F. PREFONTAINE, citizen of the United States of America, residing at Brooklyn, in the county of Kings and State of New York, have invented certain new and useful Improvements in Shutter-Operating Attachments for Cameras, of which the following is a specification.

My invention relates to attachments for cameras and has for its object to provide means whereby the operator can actuate the shutter mechanism from a distance for the purpose of taking his own picture.

It frequently happens that the members of a party including the person selected to operate the camera desire to have their pictures taken in a group and it is the object of the present invention to provide means whereby this desideratum may be attained.

In the accompanying drawings forming part of this specification:

Figure 1 is a front view of my invention attached to a camera showing the position of the parts when the shutter lever is in elevated position and before taking a picture;

Fig. 2 is a similar view showing the position of the parts when the shutter lever has been moved to lowermost position and a picture has been taken.

Fig. 3 is a side elevation of my invention attached to a camera.

Referring more particularly to the drawings wherein like numerals indicate corresponding parts throughout the several views 25 represents a small plate bolted as at 26 to the front face of the camera 27. This plate is formed with an outwardly projecting lug 27' to which is pivotally secured a bell crank lever 28. One arm of the lever 28 is connected by means of a cord or the like 29 to the shutter lever 30 normally held in its uppermost position by a spring (not shown). An operating cord or the like 31 is connected to the other arm 32 of the lever 28.

When the parts are in the position illustrated in Fig. 1 and the operator desires to take a picture he will pull the cord 31 which may lead to any desired place remote from the camera. This causes the shutter lever 30 to be depressed to the position illustrated in Fig. 2 and actuates the shutter. The shutter lever will return to Fig. 1 position when tension on the cord 31 is released.

From the foregoing it will be seen that I have devised a very simple device which can be readily attached to a spring return shutter camera.

Having thus described my invention, what I claim is:

In an attachment for cameras having spring return shutter levers, a plate adapted to be secured to the face of a camera, said plate having an outwardly projecting lug, a bell crank lever pivoted to said lug and having an upper and a lower arm, a cord for connecting the lower arm of said bell crank to the shutter lever and an operating cord connected to the upper arm of said lever for moving said lower arm downwardly and thereby operating the shutter by means of said connecting cord.

In testimony whereof I affix my signature in presence of two witnesses.

HARRY F. PREFONTAINE.

Witnesses:
WILLIAM J. BROWN,
JAMES J. ASTARITA.

Copies of this patent may be obtained for five cents each, by addressing the "Commissioner of Patents, Washington, D. C."